March 28, 1950     E. C. GILLETTE     2,501,718
PINKING SHEARS
Filed Feb. 25, 1949
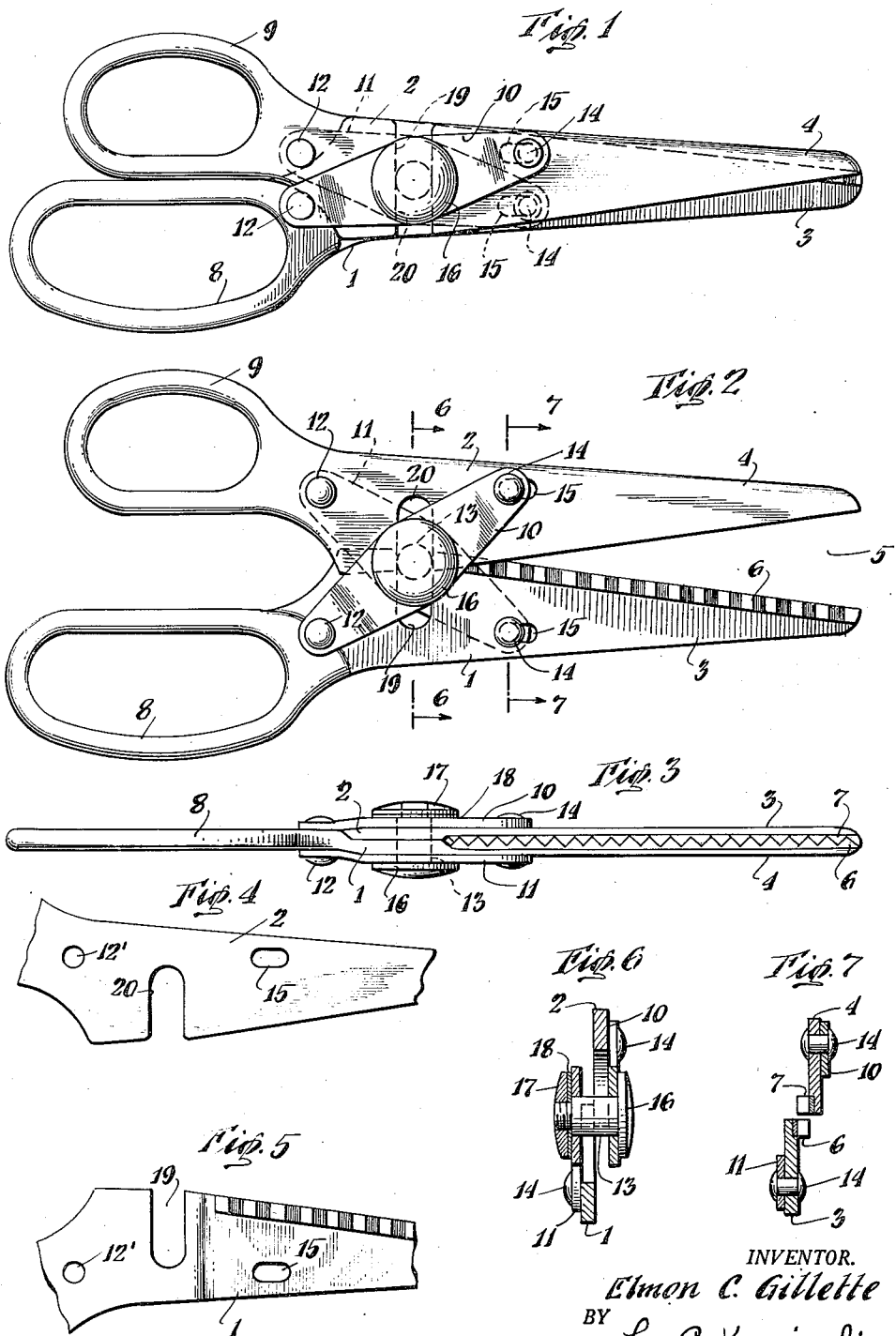
INVENTOR.
Elmon C. Gillette
BY Leo C. Krazinski
ATTORNEY Patented Mar. 28, 1950

2,501,718

UNITED STATES PATENT OFFICE 2,501,718

PINKING SHEARS

Elmon C. Gillette, New York, N. Y.

Application February 25, 1949, Serial No. 78,279

6 Claims. (Cl. 30—230)

My invention relates to shears, particularly to pinking shears adapted for cutting fabric and similar material on a zig-zag line, and has for its primary object to provide improved pinking shears of a portable type, which are simple and inexpensive to make and which are adapted for cutting fabrics and other material easily and accurately in a zig-zag or similar pattern.

In United States Patent No. 2,290,203 of July 21, 1942, there are disclosed pinking shears in which the handles are pivotally connected to the jaws, means being provided to maintain the jaws in parallel alignment. I have found, however, that a more improved and very effective construction is obtained by forming the handles integrally with the jaws, with pivoted links for causing the jaws to move in parallel alignment, side by side. With my improved type of pinking shears the handles need not be moved far apart for the same opening of the jaws, thereby enabling persons with small hands to readily use the shears, and the construction of the shears is simpler with corresponding reduction in their weight and cost.

Another object, therefore, of the invention is to provide an improved pinking shear having cutting elements movable in parallel relationship with respect to each other and having handles that are adapted for reduced movement in proportion to the jaw opening.

Other and further objects will be obvious upon an understanding of the illustrative embodiment about to be described, or will be indicated in the appended claims, and various advantages not referred to herein will occur to one skilled in the art upon employment of the invention in practice.

My invention is more fully described in the accompanying specification and drawing in which:

Fig. 1 is a side view of my improved shears with the jaws closed;

Fig. 2 is a similar view with the jaws fully opened;

Fig. 3 is a top plan view of the shears;

Fig. 4 is an enlarged view of a portion of the upper element shown in Fig. 2;

Fig. 5 is an enlarged view of a portion of the lower element shown in Fig. 2; and Fig. 6 and Fig. 7 are sectional views taken along lines 6—6 and 7—7 of Fig. 2 in the direction of the arrows.

Referring now to the drawing, particularly to Figs. 1, 2, and 3, there are shown pinking shears comprising a pair of bars 1 and 2, movable in parallel relationship with respect to each other, as will appear hereinafter, and provided with tapering front ends or jaws 3 and 4, respectively, forming a divergent opening 5, as seen in Fig. 2. The inner edges of the jaws are shown provided with teeth 6 and 7, which may be of zig-zag shape, or of any other suitable form, that is, scalloped, wavy, etc. The teeth 6 and 7 have straight edges, so that they slide alongside each other as the jaws are moved up and down in parallel alignment. The rear ends of the bars are provided with loop-shaped handles 8, 9.

The bars 1, 2 are respectively joined together by links 10, 11 disposed at opposite sides of the shears, which links are pivoted at the rear ends to their respective bars by pivots 12 disposed in apertures 12' and pivotally connected together at their central portions by a pin 13. The front ends of the links are pivoted to the bars 1, 2 by pivots 14 sliding in parallel slots 15 disposed in the bars. The pin 13 has a large head 16 at one end and is threaded at its other end for a round nut 17, with a spring washer 18 to keep the bars resiliently pressed against each other. The bars have slots 19, 20 for the central pin. A more clear understanding of this relationship of the slots and apertures on the bars 1, 2 may be obtained by reference to Figs. 4 and 5.

The bars 1, 2 are relatively thick in the middle, as is readily apparent in Fig. 3, so that their inner sides touch each other, and are of reduced thickness behind the teeth 6, 7, forming clearances for the heads of the pivots 14.

The operation of my pinking shears will be readily apparent from an inspection of the various figures of the drawing. With the shears in the closed position, as shown in Fig. 1, separation of the handles 8 and 9 will cause the jaws 3 and 4, under the influence of links 10 and 11, to move apart with the teeth 6 and 7 moving in parallel alignment until the jaws are separated to their outermost extent, as shown in Fig. 2, after which contraction of the handles will return the jaws to the closed position, thereby completing the cycle. It is to be noted that bar 1, including jaw 3 and handle 8, moves in a parallel plane with respect to bar 2, including jaw 4 and handle 9, and that this is accomplished through links 10 and 11, which are pivoted at one point, namely 12, whereas the other ends of the links 10 and 11, through the pins 14, are slidable in the parallel, elongated slots 15. This movement of the bars 1 and 2 is brought out in Figs. 6 and 7.

As various changes may be made in the form, construction and arrangement of the parts here-

What I claim is:

1. Pinking shears comprising a pair of elongated bars having handles integrally formed at the rear ends; a pair of links pivotally connected to the bars and crossing each other at their middle portions; a pivot connecting the middle portions of the links; the bars having parallel slots for the links for causing the bars to retain parallel alignment when they are moved toward each other or away from each other, the front ends of the bars being tapered and provided with cutting elements.

2. Pinking shears comprising a pair of elongated bars having handles integrally formed at the rear ends; a pair of links pivotally connected to the bars and crossing each other at their middle portions; a pivot connecting the middle portions of the links; the bars having parallel slots for the links for causing the bars to retain parallel alignment when they are moved toward each other or away from each other, the bars sliding side by side in their movement and being provided with slots for the central pivot; the front portions of the bars forming a diverging opening when the bars are moved apart; and mutually coacting cutting elements on the edges of the bars at the diverging opening.

3. Pinking shears comprising a pair of elongated bars having handles integrally formed at the rear ends; a pair of links pivotally connected to the bars at the opposite sides and crossing each other at their middle portions; a pivot connecting the middle portions of the links, the bars having parallel slots for the ends of the links at one side of the central pivot for maintaining parallel alignment of the bars when they are manually moved together or apart; and mutually coacting cutting elements at the front portions of the bars, the middle portions of the bars overlapping each other and being provided with slots for the central pivot.

4. Pinking shears comprising a pair of elongated bars formed with handles at the rear ends and elongated jaws at the front ends; a pair of links pivotally connected together at their middle portions and pivotally connected to the bars at their outer ends, the bars having parallel slots for the link pivots and being thereby adapted to retain their parallel alignment when manually moved together or apart; the front portions of the bars being tapered so as to form a diverging opening; and mutually coacting cutting teeth at the edges of the bars in the opening, the teeth being formed with straight edges extending transversely of the bars, the teeth of one bar being adapted to slide in corresponding slots in the other bar.

5. Pinking shears comprising a pair of elongated bars formed with handles at the rear ends and elongated jaws at the front ends; a pair of links pivotally connected together at their middle portions and pivotally connected to the bars at their outer ends, the bars having parallel slots for the link pivots and being thereby adapted to retain their parallel alignment when manually moved together or apart, the bars being adapted to slide at the side of each other, cutting elements at the front ends of the bars; and resilient means for urging the bars against each other.

6. Pinking shears comprising a pair of elongated bars having loop-shaped handles at the rear ends; the front ends of the bars forming a diverging opening; coacting teeth on the bars at the diverging opening, the bars being adapted to be manually moved together; and means to maintain the bars in parallel alignment; said means comprising a pair of links at opposite sides of said bars; a pin for pivotally connecting the links together at their middle portions; and pivots for connecting the links to the bars at their outer ends, the bars having horizontally spaced, parallel slots for two of the pivots and vertically aligned slots for the pin.

ELMON C. GILLETTE.

No references cited.